United States Patent [19]

Hall et al.

[11] Patent Number: 4,803,857
[45] Date of Patent: Feb. 14, 1989

[54] BICYCLE AIR PUMP RESTRAINING DEVICE

[75] Inventors: David R. Hall, Plymouth; Warren J. Clark, Whitmore Lake, both of Mich.

[73] Assignee: HCC Corporation, Plymouth, Mich.

[21] Appl. No.: 116,917

[22] Filed: Nov. 5, 1987

[51] Int. Cl.[4] .............................................. E05B 73/00
[52] U.S. Cl. ............................................ 70/58; 70/14; 70/18; 70/233
[58] Field of Search ........................ 70/14–19, 70/57–59, 61, 63, 233–236

[56] References Cited

U.S. PATENT DOCUMENTS

| 924,824 | 6/1909 | Peebler | 70/59 X |
|---|---|---|---|
| 1,329,784 | 2/1920 | Lundin | 70/58 |
| 1,338,512 | 4/1920 | Lundin | 70/58 |
| 1,439,111 | 12/1922 | Laney | 70/19 X |
| 1,499,960 | 7/1924 | Almedia | 70/18 X |
| 1,585,962 | 5/1926 | Bray | 70/19 X |
| 1,661,516 | 3/1928 | Vineberg | 70/59 X |
| 1,780,473 | 4/1930 | Gill | 70/16 |
| 1,881,577 | 10/1932 | Hillyard | 70/16 |
| 2,655,806 | 10/1953 | Stiler | 70/57 |
| 4,020,662 | 5/1977 | Fowler | 70/18 X |
| 4,059,209 | 11/1977 | Grisel | 70/58 X |
| 4,118,960 | 10/1978 | Lipshutz | 70/59 |
| 4,468,939 | 9/1984 | Olshausen | 70/58 |

FOREIGN PATENT DOCUMENTS

| 104454 | 7/1899 | Fed. Rep. of Germany | 70/16 |
|---|---|---|---|
| 470570 | 5/1969 | Switzerland | 70/19 |

Primary Examiner—Robert L. Wolfe
Assistant Examiner—Suzanne L. Dino
Attorney, Agent, or Firm—Charles W. Chandler

[57] ABSTRACT

A locking device comprises a pair of double pivoted jaw members which, in their closed position, define a pair of closely spaced parallel gripping apertures, and in their open position define transverse entry passages to the apertures, one of which is adapted to lock a bicycle air pump therein, and the other of which is adapted to lock to a bicycle frame.

5 Claims, 2 Drawing Sheets

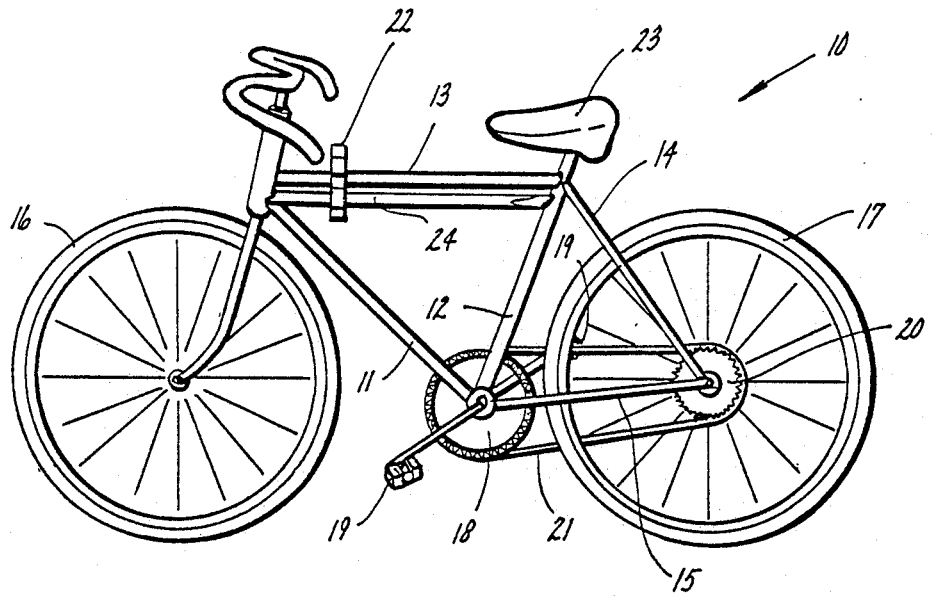
fig. 1
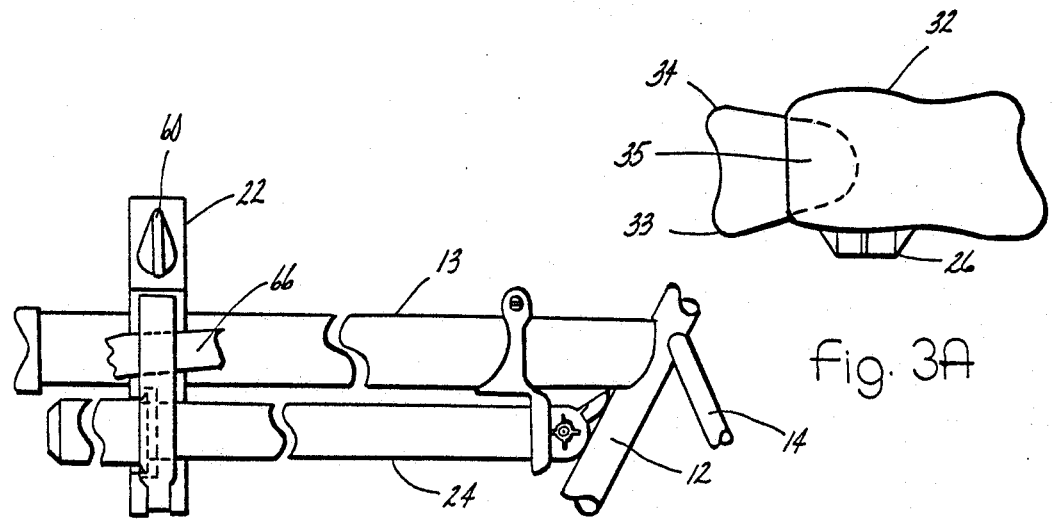
fig. 2
fig. 3A
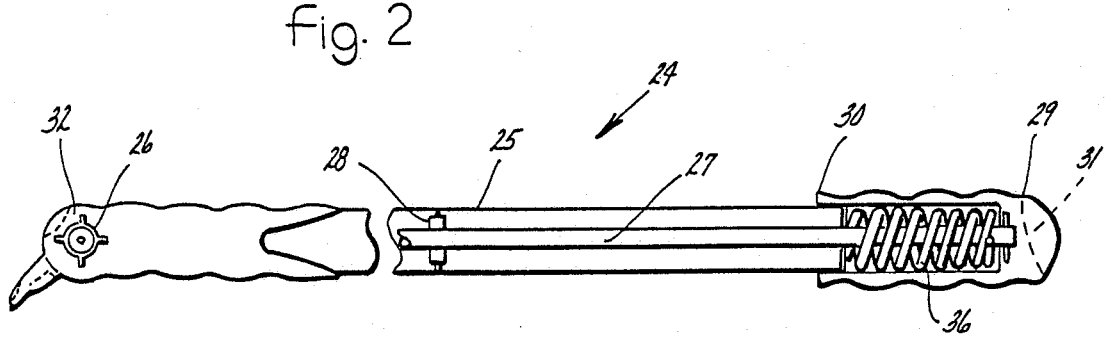
fig. 3

BICYCLE AIR PUMP RESTRAINING DEVICE

This invention relates to an air pump restraining device, and more particularly to a key locking device for locking an air pump to the frame of a bicycle.

It has become a practice to equip bicycles with a readily detachable, hand-operated air pump which the rider can employ to reinflate a punctured tire after it has been repaired with a patch or plug.

Unfortunately, these hand pumps are usually attached to the bicycle frame by means of simple spring clamps, making them easy prey for vandalism and theft.

OBJECTS OF THE INVENTION

It is an object of this invention to provide an improved locking restraining device for connecting small manually-operated air pumps to bicycle frames.

It is another object of this invention to provide a key-operated restraining device to fit an air pump to the frame of a bicycle without interfering with the needs of a rider in operating the bicycle.

It is another object of this invention to provide a key locking restraining device to lock an air pump therein and to lock the restraining device to the frame of a bicycle.

SUMMARY OF THE INVENTION

A preferred key-operated locking device comprises a housing with a pair of pivoting jaw members pivoted thereto and to each other. The jaws, in their closed position, define a pair of gripping cylindrical apertures, one of which may engage a cylinder of an air pump, while the other engages a part of the tubular frame of a bicycle. As the ends of the jaw members approach the housing, a projecting latch member on one jaw member is adapted to overlap the other and to proceed into an aperture in the housing and be locked therein by a key-operated lock assembly and at the same time, locking the overlapped jaw member in its closed position.

This invention will be better understood when taken in connecting with the following description and drawings.

BRIEF DESCRIPTION OF THE DRAWINGS

FIG. 1 is an elevational and schematic view of one example of a bicycle to which this invention may be attached.

FIG. 2 is a schematic illustration of one assembly of an air pump and the key-operated locking device of this invention attached to the of FIG. 1.

FIG. 3 is a partial sectional view of a simple air pump which can be utilized in the key-operated locking device of this invention.

FIG. 3A is a schematic illustration of the end section of the pump of FIG. 3 rotated 90° to show a foot part thereof.

DESCRIPTION OF THE PREFERRED EMBODIMENT

Figure 4:
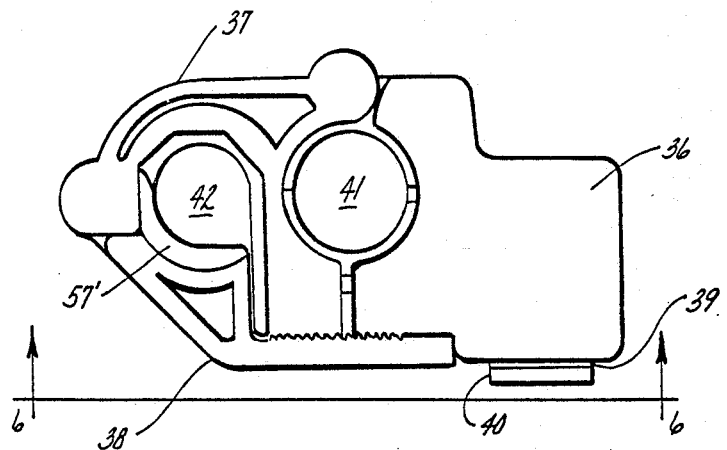
FIG. 4 a plan and schematic view of the key-operated locking device of this invention in its closed and locked position.

FIG. 1 schematically illustrates a bicycle 10 comprising a number of tubular metal members 11-15 suitably joined by welding, for example, to provide a frame to which are attached heels 16 and 17, driving sprocket 18, foot pedals 19, driven sprocket 20, and closed loop chain 21. A key-operated locking device 22 of this invention is conveniently attached to tubular member 13 as illustrated in FIG. 2, but may also be joined to tubular member 12.

Referring now to FIG. 2, there is schematically illustrated a bicycle tubular frame member 13 which is shown as interconnecting with members 12 and 14 to provide support for seat 23 (FIG. 1). In FIG. 2 the key-operated locking device 22 is fastened to and encircles member 13 while at the same time encircling an air pump 24. Air pump 24 is best described with respect to FIG. 3.

Referring now to FIG. 3, there is illustrated a simple manually operated air pump 24. Air pump 24 comprises a narrow barrel or cylinder 25 with an air valve 26 at one end. Adapted for reciprocal motion in cylinder 25 is a piston rod 27 which is usually fitted with a combination of a piston and piston packing 28 at one end of rod 27 in cylinder 25. At the other end of rod 27 is a ribbed handle 29 formed with an outwardly flared guard or haft 30. Handle 29 also includes a channel or groove 31 at the exposed end thereof which is adapted to partly receive a frame tubular member therein. When pump 24 is sufficiently long and positioned between two angled tubular members such as tubular members 11 and 12 of FIG. 1, groove 31 is complementarily angled.

The other end of pump barrel 25 is fitted with an angled foot member 32 which is best described with respect to FIGS. 3 and 3A.

Referring to FIG. 3, pump 24 includes handle 29 at one end thereof and foot member 32 at the other end. Foot member 32 is in the form of a closed end tube or sleeve which fits tightly about barrel 25. Foot member 32 is also provided with splayed projections which are best shown in FIG. 3A. FIG. 3A is a view of foot member 32 of FIG. 3 rotated about its longitudinal axis to show a plan or side view thereof. Foot member 32 also includes a shallow groove interconnecting projections 33 and 34 to receive therein a tubular member such as member 12 of FIG. 2.

It is preferable to have pump 24 spring biased into position. Accordingly, as illustrated in FIG. 3, a spring means 36 is interposed in handle 29 and encircling rod 27 so that when handle 29 is moved axially towards barrel 25, spring 36 presses against the end of barrel 25 and is compressed. Spring 36 provides a spring-biasing action which serves to retain pump 24 in a mounted position as illustrated in FIGS. 1 and 2 and reduce looseness and vibration at the pump ends.

Handle 29 and rod 27 with piston and packing 28 thereon are moved as a unit with a reciprocating motion within cylinder 25 to force air out of valve 26. Valve 26 is the well known operating cap of a very common Schrader valve used in most pneumatic tires of bicycles as well as automotive vehicles. In the present invention, valve 26 is pressed against the companion Schrader valve on the tire, and reciprocating motion of handle 28 forces air under pressure out of valve 26 into the tire.

Pump 24 is locked into restraining device 22 of this invention and at the same time restraining device 22 is locked to a tubular member of bicycle 20. Operation of this device and the dual locking feature are best described with respect to FIGS. 4 and 5.

Figure 6:
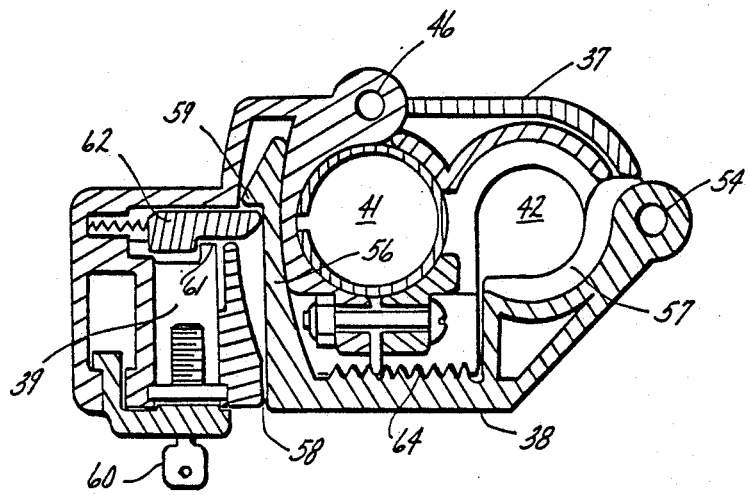
FIG. 6 is a plan, left to right reverse sectional view of one half of the key-operated locking device of this invention divided along line 6—6 and in the direction of its arrows, as illustrated in FIG. 4.

Referring now to FIG. 4, restraining device 22 is illustrated in its closed position. Restraining device 22 comprises a housing 36 with a pair of encircling or jaw members 37 and 38 attache thereto in a double pivot relationship. Housing 36 also contains a key-operated locking device which includes a simple, well known cylinder tumbler lock 39 therein, as illustrated in FIG. 6, together with a swinging cover 40 which protects the keyway from entry of foreign matter. Housing 36 together with jaws 37 and 38 define a pair of circumferentially gripping apertures 41 and 42 passing transversely therethrough. The pivot attachment of jaw members 37 and 38 to housing 36 in a dual pivot relationship is best descried with respect to FIG. 5.

Figure 5:
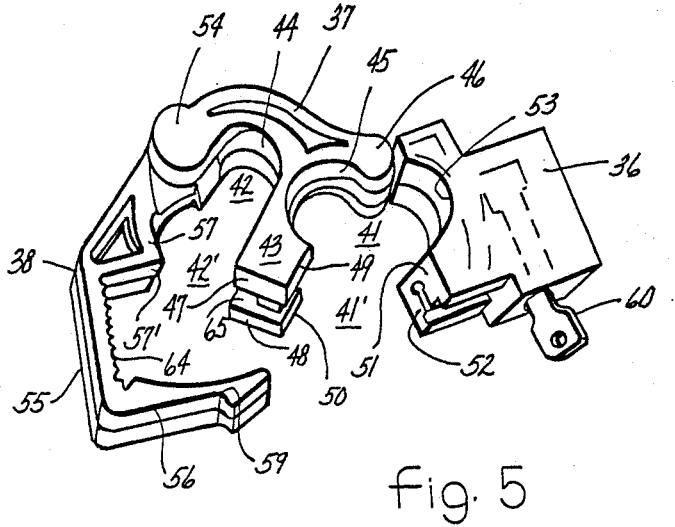
FIG. 5 is a plan and sectional view of the key-operated locking device of this invention in its open and unlocked position.

Referring now to FIG. 5, device 22 is illustrated with jaw members 37 and 38 in their open position so that openings 41 and 42 may encircle spaced parallel tubes (not shown) and defining wide transverse passages 41' and 42' into apertures 41 and 42, respectively. Jaw member 37 may be described as having a double J hook configuration comprising a central shank 43 and opposed semi-circular hook sections 44 and 45. At the end of the arc of hook section 45, there is a pivot 46 which permits jaw member 37 to pivot toward and away from housing 36.

Shank 43 includes right angled surfaces 47, 48, 49 and 50. When jaw member 37 is pivoted toward housing 36 to its maximum degree, shank surfaces 49 and 50 engage complementary surfaces 51 and 52 on housing 36. At the same time hook section 45 of jaw member 37 comes into complementary relationship with a hook section 53 in housing 36 to define aperture 41, as illustrated in FIG. 4.

At the end of the arc of hook section 44 is a pivot 54. Fixed to pivot 54 and arranged to pivot thereabout is second jaw member 38. Jaw member 38 may be described as a shallow hook member comprising an extending shank 55 with a right angled latch member 56 extending therefrom. Jaw member 38 includes a ridged arcuate structure 57 with a ridge 57' thereon. When jaw member 38 is pivoted about swing pivot 54, arcuate structure 57 and ridge 57' become a complementary part of hook section 44 of jaw member 37 to provide cylindrical aperture 42 as depicted in FIGS. 4 and 5.

A tubular member, such as handle 29 of air pump 24, is positioned concentrically in aperture 42 and is tightly grasped therein by arcuate structure 57 and hook section 44 of jaw members 37 and 38, respectively. As described, pivot 54 is a swinging pivot of the dual pivots 46 and 54. It is a swinging pivot because the pivot itself moves along the arc generated by jaw member 37 in pivoting about its pivot 46. As jaw member 37 is pivoted about pivot 46 to form or close aperture 41, swinging pivot 54 is moved in an arcuate path so that latch member 56 is brought into a favorable alignment position to enter latch passage 58 in housing 36.

The use of a double pivot in this invention provides a quick opening device which opens a pair of grasping apertures very quickly in one swinging action with a wide transverse passage into each aperture while also providing quick and easy attachment to a pair of tubular items such as a bicycle frame and an air pump cylinder. Closing and locking of this invention is best described with respect to FIG. 6.

Referring now to FIG. 6, latch extension 56 of jaw member 38 includes a notched shoulder part 59 at the end thereof. Housing 36 of device 22 includes a passageway 58 therein which is adapted to receive latch extension 56 of jaw member 38 therein. Housing 36 also includes key-operated lock 39 adjacent passageway 58. Key-operated locking mechanism 39, as described, comprises the well-known rotating cylinder tumbler which is rotated by means of key 60 inserted therein.

As illustrated in FIG. 6, rotation of the correct key 60 in lock 39 rotates cylinder 39, such that a shoulder part 61 on cylinder 39 engages a sliding spring-biased latch member 62. Latch member 62 rests in a passage 63 which communicates perpendicularly with passage 58 in which latch extension 56 is positioned. Latch member 62 is spring-biased so that it moves into passage 58 and engages shoulder part 59 of extension 56 and thus prevents extension 56 from moving out of passage 58 as well as thus preventing jaw member 38 from pivoting about pivot 54. Accordingly, the open position of FIG. 5 is obtainable only by utilizing key 60 to release latch 56 and permit jaw member 38 to be rotated about dual pivots 46 and 54. Restated, the dual pivot means of this invention comprise a first pivot 46 which is a fixed pivot, i.e. the pivot assembly is stationary, and a swinging pivot 54, i.e. the pivot assembly moves along an arc described by jaw 37 to, which it is attached. It is the swinging dual pivot assembly which provides rapid and easy wide opening of device 22 with minimal complexity while at the same time defining large transverse passages into apertures 41 and 42.

In order to further avoid an unlawful removal of pump 24 or opening of device 22, the pivot pins for pivots 46 and 54 are recessed within the construction material of device 22. Device 22 is manufactured so that the pivot pins are hidden and not exposed. Otherwise exposed pins may be pushed out of their apertures with the result that device 22 is in fact disassembled and opened. Where device 22 is manufactured, for example, by a metal die casting process, the die cast metal is formed as a cap or cover over pivots 46 and 54 to categorize those pivots as recessed or hidden pivots.

A further advantage of this invention is its retention ability for other cycle riding accessories. For example, many cycle riders wear a protective head covering referred to as a helmet or crash helmet. The inner surface of the helmet is covered by a soft cloth-like or a foamed resin material to provide a cushioning effect between the shell and the rider's head as well as a surface conforming to the shape of the rider's head. In case of an unfortunate accident where the rider might be dislodged from seat 23 and tumble to the roadway, the helmet serves to absorb the shock force of the rider's helmeted head coming into contact with the roadway or other objects. Such helmets usually include a flexible woven material synthetic resin or leather strap which passes from one side of the helmet to the other side, under the rider's chin. The strap serves to retain the helmet on the rider's head. In many instances a rider wishes to leave the helmet with the bicycle when departing from the bicycle to engage in other activities. When so doing, the helmet is also subject to vandalism and theft.

The locking restraining device 22 of the present invention provides means to lock a helmet thereto by the use of the helmet retaining strap. For example, as illustrated in FIG. 5, the jaw member 38 includes a shank section 55 which, when device 22 is in its closed position, as illustrated in FIG. 4, overlies flat surfaces 47 and 48 of shank 43. The inner surface of shank 55 which comes close to surfaces 47 and 48 contains a row of very closely spaced pointed spires 64 which, when device 22 is in its closed position of FIG. 6, project into the space or groove 65 separating surfaces 47 and 48 of shank 43.

In order to lock a helmet to device 22, the helmet strap is passed between shank 55 of jaw member 38 and surfaces 47 and 48 of shank 43. The row of pointed spires 64 engages the strap very tightly and may indent the strap into the groove 65 so that when jaw 38 is in its closed position the strap is tightly gripped in device 22. Any buckles or clasps on the strap only serve to make the described gripping arrangement more secure if those items are not actually caught between the spires and shank 43.

This invention provides a key-operated locking device which grips a pair of tubular members in parallel relationship in gripping apertures. It is readily adaptable to lock tubes of smaller diameters by including sleeves or semi-sleeves of a non-metallic material in the gripping apertures. In any event, a synthetic resin coating on the interior walls of apertures 41 and 42 will air in preventing injury to a highly finished enamel coating on the tubes to which the device is locked.

As illustrated in FIG. 2, device 22 of this invention is locked to a tubular frame member of a bicycle by means of gripping aperture 41. The barrel or handle of a hand pump is gripped in the other aperture 42 and the hand pump is locked into close proximity with the bicycle frame tubular member and parallel thereto. Also, as illustrated in FIG. 2, the described strap 66 of a rider's helmet may also be locked into device 22.

This invention provides a dual pivot key-operated locking restraining device which attaches an air pump and optionally, a helmet, to a bicycle frame with the air pump in a position non-interfering with the bodily motions of the rider. The lock cylinder 39 and key arrangement as described may be easily replaced with a well known combination lock device wherein manual manipulation of certain exposed elements in precise mathematical relationship permits the device to be opened.

While a preferred embodiment of this invention has been disclosed and described, it will be apparent to those skilled in the art that various changes and modifications may be made therein without departing from the scope of the invention as defined in the appended claims.

We claim:

1. A locking device for securing a tubular pump or the like to an elongated frame member of a bicycle, in a spaced parallel relationship, the pump having an elongated body with an outwardly flared guard, said device comprising:

a housing having an opening;
a first jaw;
a second jaw having locking structure receivable in said opening;
first pivot means for connecting the first jaw to the housing for movement between an open position in which the first jaw cooperates with the housing to form an opening for receiving said elongated frame member in a first secured position between the housing and the first jaw along a path of motion transverse to the longitudinal axis of the elongated frame member, and a closed position in which the first jaw and the housing cooperate to encircle the elongated frame member in said opening to prevent removal thereof from said first secured position in a reverse direction of motion;
second pivot means for connecting the second jaw to the first jaw such that the second pivot means and the second jaw are swingable in an arc about the first pivot means as the first jaw is being moved between said open position and said closed position;
the second jaw being moveable with respect to the first jaw between an open position in which the second jaw cooperates with the first jaw to form an opening for receiving the outwardly flared guard of the bicycle pump body in a second secured position between the first jaw and the second jaw in which the bicycle pump body is generally parallel to the elongated frame member, and a closed position of the second jaw in which:
(a) the second jaw cooperates with the first jaw in encircling the bicycle pump body the prevent removal thereof from said parallel position;
(b) the locking structure on the second jaw is received in the housing opening; and
(c) locking means mounted in the housing engages the locking structure of the second jaw received in the housing opening to releasably lock same to the housing to prevent either the first jaw or the second jaw from being pivoted toward their respective open positions.

2. A locking device as defined in claim 1, in which the second jaw has gripping projections thereon disposed to grip a strap fastened between the second jaw and the first jaw.

3. A locking device as defined in claim 1, in which the second jaw has an internal ridge adapted to engage the flared enlargement on the pump body to prevent axial movement of the pump body when it is engaged with said device.

4. A locking device as defined in claim 1, in which the locking means is a key-actuated lock mounted in the housing.

5. A locking device as defined in claim 1, in which the locking means is a manually-operated combination lock assembly.

* * * * *